United States Patent
Chuang et al.

(10) Patent No.: US 11,665,345 B2
(45) Date of Patent: May 30, 2023

(54) METHOD AND APPARATUS OF LUMA-CHROMA SEPARATED CODING TREE CODING WITH CONSTRAINTS

(71) Applicant: HFI INNOVATION INC., Zhubei (TW)

(72) Inventors: Tzu-Der Chuang, Hsinchu (TW); Chih-Wei Hsu, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/293,657

(22) PCT Filed: Nov. 15, 2019

(86) PCT No.: PCT/CN2019/118811
§ 371 (c)(1),
(2) Date: May 13, 2021

(87) PCT Pub. No.: WO2020/098786
PCT Pub. Date: May 22, 2020

(65) Prior Publication Data
US 2022/0014739 A1     Jan. 13, 2022

Related U.S. Application Data

(60) Provisional application No. 62/768,205, filed on Nov. 16, 2018, provisional application No. 62/768,203, filed on Nov. 16, 2018.

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/176* (2014.11); *H04N 19/186* (2014.11);
(Continued)

(58) Field of Classification Search
None
See application file for complete search history.

(56) References Cited

U.S. PATENT DOCUMENTS 10,390,050 B2    8/2019  An et al.
10,567,759 B2    2/2020  Seregin et al.
(Continued)

FOREIGN PATENT DOCUMENTS

CN    107079160 A    8/2017
CN    108605134 A    9/2018
(Continued)

OTHER PUBLICATIONS

International Search Report and Written Opinion dated Jan. 21, 2020, issued in application No. PCT/CN2019/118811.
(Continued)

*Primary Examiner* — Kaitlin A Retallick
(74) *Attorney, Agent, or Firm* — Oblon, McClelland, Maier & Neustadt, L.L.P.

(57) ABSTRACT

A methods and apparatus for adaptive data dependency between corresponding blocks partitioned from separate partition trees according to an embodiment of the present invention are disclosed. The data dependency between different tree structures is allowed when the tree structures are mutually inclusive. When the splitting is not used in one tree or when splitting is used in one tree and the same splitting or no split is used in the other tree, the data dependency between different tree structures is allowed. When the splitting in different tree structures are different, then the data dependency between different tree structures is disallowed.

(Continued)

For each leaf CU in chroma tree, it should include one or more complete luma leaf CUs or it is completely included in one luma leaf CU, when the data dependency between different tree structures is allowed. Otherwise, then the data dependency between different tree structures is disallowed.

20 Claims, 6 Drawing Sheets

(51) Int. Cl.
  *H04N 19/186* (2014.01)
  *H04N 19/169* (2014.01)
  *H04N 19/46* (2014.01)
  *H04N 19/96* (2014.01)

(52) U.S. Cl.
  CPC ......... *H04N 19/1883* (2014.11); *H04N 19/46* (2014.11); *H04N 19/96* (2014.11)

(56) References Cited

U.S. PATENT DOCUMENTS

| | | | |
|---|---|---|---|
| 2005/0083307 A1 | 4/2005 | Aufderheide et al. | |
| 2010/0220783 A1* | 9/2010 | Mallat | H04N 19/136 375/240.18 |
| 2012/0140830 A1* | 6/2012 | Xu | H04N 19/176 375/240.18 |
| 2015/0156499 A1 | 6/2015 | Nakamura et al. | |
| 2017/0272759 A1* | 9/2017 | Seregin | H04N 19/70 |
| 2019/0246122 A1* | 8/2019 | Zhang | H04N 19/91 |
| 2021/0006805 A1 | 1/2021 | Urban et al. | |
| 2021/0344929 A1* | 11/2021 | Choi | H04N 19/157 |

FOREIGN PATENT DOCUMENTS

| | | |
|---|---|---|
| CN | 108781282 A | 11/2018 |
| WO | 2017/206803 A1 | 12/2017 |

OTHER PUBLICATIONS

Flynn, D., et al.; "High Efficiency Video Coding (HEVC) Range Extensions text specification: Draft 6;" Joint Collaborative Team on Video Coding (JCT-VC) of ITU-T SG 16 WP 3 and ISO/IEC JTC 1/SC 29/WG 11; Jan. 2014; pp. 1-370.

Extended European Search Report dated Jun. 10, 2022, issued in application No. EP 19884846.7.

Ye, J., et al.; "CE15-related: Palette mode when dual-tree is enabled;" Joint Video Experts Team (JVET) of ITU-T SG 16 WP 3 and ISO/IEC JTC 1/SC 29/WG 11; Oct. 2018; pp. 1-4.

123 MPEG Meeting; "Report of 122nd Meeting;" International Organisation for Standardisation; Oct. 2018; pp. 1-580.

Hsiang, S., et al.; "CE1.5.1: Separate coding tree partitioning for luma and chroma in I slices;" Joint Video Experts Team (JVET) of ITU-T SG 16 WP 3 and ISO/IEC JTC 1/SC 29/WG 11; Jul. 2018; pp. 1-5.

* cited by examiner

MXN/2
Symmetric vertical splitting

MXN/2
Symmetric horizontal splitting

M/4xN (L)

M/4xN (R)

MxN/4 (U)

MxN/4 (D)

METHOD AND APPARATUS OF LUMA-CHROMA SEPARATED CODING TREE CODING WITH CONSTRAINTS

CROSS REFERENCE TO RELATED PATENT APPLICATION(S)

The present invention claims priority to U.S. Provisional Patent Application Ser. No. 62/768,203 filed on Nov. 16, 2018, and U.S. Provisional Patent Application Ser. No. 62/768,205 filed on Nov. 16, 2018. The U.S. Provisional Patent Applications are hereby incorporated by reference in their entireties.

TECHNICAL FIELD

The present invention relates to block partition of luma and chroma blocks using separate partition trees in video coding. In particular, the present invention discloses control schemes of dependent cross component coding to reduce complexity or required system resources.

BACKGROUND

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014, Document: JCTVC-P1005). In the proposed binary tree partitioning structure, a block can be recursively split into two smaller blocks using various binary splitting types as shown in FIG. 3. The most efficient and simplest ones are the symmetric horizontal and vertical split as shown in the top two splitting types in FIG. 3. For a given block of size M×N, a flag is signalled to indicate whether the given block is split into two smaller blocks. If yes, another syntax element is signalled to indicate which splitting type is used. If the horizontal splitting is used, the given block is split into two blocks of size M×N/2. If the vertical splitting is used, the given block is split into two blocks of size M/2×N. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implicitly implied when splitting would result in a block width smaller than the indicated minimum. FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

QTBT Structure

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called as quadtree plus binary tree (QTBT) structure, has been disclosed. According to the QTBT structure, a CTU (or CTB for I slice) is the root node of a quadtree and the CTU is firstly partitioned by a quadtree, where the quadtree splitting of one node can be iterated until the node reaches the minimum allowed quadtree leaf node size (i.e., MinQTSize). If the quadtree leaf node size is not larger than the maximum allowed binary tree root node size (i.e., MaxBTSize), it can be further partitioned by a binary tree. The binary tree splitting of one node can be iterated until the node reaches the minimum allowed binary tree leaf node size (i.e., MinBTSize) or the maximum allowed binary tree depth (i.e., MaxBTDepth). The binary tree leaf node, namely CU (or CB for I slice), will be used for prediction (e.g. Intra-picture or inter-picture prediction) and transform without any further partitioning. There are two splitting types in the binary tree splitting: symmetric horizontal splitting and symmetric vertical splitting. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

An example of QTBT structure is shown as follows. For a CTU with size 128×128, the minimum allowed quadtree leaf node size is set to 16×16, the maximum allowed binary tree root node size is set to 64×64, the minimum allowed binary tree leaf node width and height both is set to 4, and the maximum allowed binary tree depth is set to 4. Firstly, the CTU is partitioned by a quadtree structure and the leaf quadtree unit may have size from 16×16 (i.e., minimum allowed quadtree leaf node size) to 128×128 (equal to CTU size, i.e., no split). If the leaf quadtree unit is 128×128, it cannot be further split by binary tree since the size exceeds the maximum allowed binary tree root node size 64×64. Otherwise, the leaf quadtree unit can be further split by binary tree. The leaf quadtree unit, which is also the root binary tree unit, has binary tree depth as 0. When the binary tree depth reaches 4 (i.e., the maximum allowed binary tree as indicated), no splitting is implicitly implied. When the block of a corresponding binary tree node has width equal to 4, non-horizontal splitting is implicitly implied. When the block of a corresponding binary tree node has height equal to 4, non-vertical splitting is implicitly implied. The leaf nodes of the QTBT are further processed by prediction (Intra picture or Inter picture) and transform coding.

For I-slice, the QTBT tree structure usually applied with the luma/chroma separate coding. For example, the QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

LM Chroma Mode

The Intra predictor is usually designed to exploit spatial features in the picture such as smooth area (DC mode), vertical line or edge, horizontal line or edge and diagonal line or edge. Furthermore, spatial correlation often exists between the luminance (luma) and chrominance (chroma) components. Therefore, reconstructed luma pixels can be used to derive the Intra chroma prediction. In the emerging High Efficiency Video Coding (HEVC), a chroma Intra prediction mode based on the reconstructed luminance signal has been considered. This type of chroma Intra prediction is termed as Linear Model (LM) prediction. FIG. 6 illustrates the Intra prediction derivation for LM mode. First, the neighbouring reconstructed pixels (indicated by circles) of a collocated luma block (i.e., Y block) and the neighbouring reconstructed pixels (indicated by circles) of a chroma block (i.e., U or V block) in FIG. 6 are used to derive the linear model parameters between the blocks. The predicted pixels of the chroma block are generated using the parameters and the reconstructed pixels of the luma block. In the parameters derivation, the top reconstructed pixel row adjacent to the top block boundary of the current luma block and the left reconstructed pixel column adjacent to the left block boundary of the current luma block are used. It is noted that the second left reconstructed pixel column from the left boundary is used instead of the left column immediately adjacent to the left boundary in order to match the sampling locations of the chroma pixels. The specific row and column of the luma block are used in order to match the 4:2:0 sampling format of the chroma components. While FIG. 6 illustrates the example of LM chroma mode for the 4:2:0 sampling format, the LM chroma mode for other chroma sampling format may also derived similarly.

According to the LM prediction mode, the chroma values are predicted from reconstructed luma values of a collocated block. The chroma components may have lower spatial resolution than the luma component. In order to use the luma signal for chroma Intra prediction, the resolution of the luma signal may have to be reduced to match with that of the chroma components. For example, for the 4:2:0 sampling format, the U and V components only have half of the number of samples in vertical and horizontal directions as the luma component. Therefore, 2:1 resolution reduction in vertical and horizontal directions has to be applied to the reconstructed luma samples. The resolution reduction can be achieved by down-sampling process or sub-sampling process.

In LM chroma mode, for a to-be-predicted chroma sample V with its collocated reconstructed luma sample $V_{col}$, the linear model to generate LM predictor P is formulated as follows:

$$P = a \cdot V_{col} + b$$

In the above equation, a and b are referred as LM parameters. The LM parameters can be derived from the neighbouring reconstructed luma and chroma samples around the current block so that the parameters do not need to be coded in the bitstream. After deriving the LM parameters, chroma predictors can be generated from the collocated reconstructed luma samples in the current block according to the linear model. For example, if the video format is YUV420, then there are one 8×8 luma block (610) and two 4×4 chroma blocks (620 and 630) for each 8×8 coding unit, as shown in FIG. 6. In FIG. 6, each small square corresponds to one pixel in the current coding unit (2N×2N for luma and N×N for chroma) to be coded. The LM parameters are derived first based on neighbouring reconstructed samples of the current coding unit, which are represented as circles in FIG. 6. Due to the YUV420 sampling format, the collocated chroma position is located between two corresponding vertical luma samples. An average value between two corresponding vertical luma samples is used to derive the LM parameters. For neighbouring pixels above the top block boundary, the average value is replaced by the closest sample in the vertical direction in order to reduce the line buffer requirement. The neighbouring pixels (as shown in circles) of the currently luma (Y) and chroma (U or V) coding units are used to derive the LM parameters for the respective chroma component as shown in FIG. 6. After the LM parameters are derived, the chroma predictors are generated based on the linear model and the collocated luma reconstructed samples. According to the video format, an average luma value may be used instead of the corresponding luma sample.

Since the tree structure of luma and chroma components are separated and the data dependency between luma and chroma components exists, the chroma component cannot be processed until the process of the corresponding luma component is finished. For example, in LM chroma mode, the chroma predictors depend on the luma reconstructed samples. Only when the luma reconstruction process is finished and the luma reconstructed samples are ready, then the chroma predictors can be generated. The latency in the worst case will become one CTU or one unit with interleaved luma and chroma components. For example, if the tree structures of luma and chroma components are interleaved organized in one 64×64 unit by one 64×64 unit, then the chroma component cannot be processed until the process of the corresponding luma 64×64 block is finished. This introduces the buffer usage in a pipeline video coding system. The present invention discloses various methods to reduce the buffer requirement as well latency issue.

BRIEF SUMMARY OF THE INVENTION

A method and apparatus for block partition in video encoding and decoding are disclosed. According to one method of the present invention, input data associated with a current block in a current picture are received, where the input data comprise pixel data to be encoded at an encoder side or compressed data at a decoder side, and wherein the current block comprises a luma block and a chroma block. The luma block is partitioned into one or more luma leaf blocks using a luma partition tree and the chroma block is partitioned into one or more chroma leaf blocks using a chroma partition tree. If a target chroma leaf block does not include said one or more complete luma leaf blocks, and the target chroma leaf block is not completely included in one luma leaf block, the data dependency between the target chroma leaf block and said one or more corresponding luma leaf blocks is disallowed.

In one embodiment, the data dependency between the target chroma leaf block and said one or more corresponding luma leaf blocks is allowed when the target chroma leaf block includes said one or more complete luma leaf blocks. After the target chroma leaf block and said one or more complete luma leaf blocks are processed, buffered samples for processing the target chroma leaf block and said one or more complete luma leaf blocks can be discarded. In another embodiment, the data dependency between the target chroma leaf block and said one or more corresponding luma leaf blocks is allowed when the target chroma leaf block is completely included in one luma leaf block.

In one embodiment, when the data dependency between the target chroma leaf block and said one or more corresponding luma leaf blocks is allowed, the target chroma leaf block is encoded or decoded using information associated with one or more corresponding luma leaf blocks. The target chroma leaf block can be encoded or decoded using LM chroma mode.

According to another method, the luma block is partitioned into one or more luma leaf blocks using a luma partition tree and the chroma block is partitioned into one or more chroma leaf blocks using a chroma partition tree. For a first node in the luma partition tree and a second node in the chroma partition tree, if no splitting is applied to one of the first node and the second node or if one of the first node and the second node uses a first splitting and another of the first node and the second node either uses a second splitting being same as or equivalent to the first splitting or uses no splitting, data dependency between one or more luma leaf blocks associated with the first node and one or more chroma leaf blocks associated with the second node is allowed, wherein the second node in the chroma partition tree is a corresponding node of the first node in the luma partition tree. In some embodiments, if different splittings are applied to the first node and the second node, the data dependency between said one or more luma leaf blocks associated with the first node and said one or more chroma leaf blocks associated with the second node is disallowed.

In one embodiment, the data dependency between said one or more luma leaf blocks associated with the first node and said one or more chroma leaf blocks associated with the second node is allowed when no splitting is applied to one of the first node and the second node. In another embodiment, the data dependency between said one or more luma leaf blocks associated with the first node and said one or more chroma leaf blocks associated with the second node is allowed when one of the first node and the second node uses the first splitting and another of the first node and the second node either uses the second splitting being same as or equivalent to the first splitting or uses no splitting.

In one embodiment, a flag is signalled or inferred at a designated level corresponding to the first node in the luma partition tree or the second node in the chroma partition tree, wherein the flag indicates the data dependency between said one or more luma leaf blocks associated with the first node and said one or more chroma leaf blocks associated with the second node is allowed or not. The designated level may correspond to a CTU (Coding Tree Unit) level or a block level. For example, the block level can be defined as a maximum transform size or a pre-defined value. The pre-defined value can be signalled at a sequence level, picture level, slice level, tile group level or tile level.

In one embodiment, when the data dependency between said one or more luma leaf blocks associated with the first node and said one or more chroma leaf blocks associated with the second node is allowed, said one or more chroma leaf blocks associated with the second node are encoded or decoded using information from said one or more luma leaf blocks associated with the first node. For example, said one or more chroma leaf blocks associated with the second node are encoded or decoded using LM chroma mode.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The latency is introduced by the data dependency between different tree structures. In order to reduce the latency, an invention is disclosed to constrain the data dependency between different tree structures. The idea is to allow the data dependency between different tree structures only when the tree structures are mutually inclusive. In other words, when the splitting is not used in one tree or when the splitting is used in one tree and the same splitting or no split is used in the other tree, the data dependency between different tree structures is allowed. When the splitting in different tree structures are different, then the data dependency between different tree structures is disallowed. The "splitting" here refers to splitting at one node in one tree structure or another node in another tree structure. The "splitting one tree" and "the . . . splitting . . . in the other tree" refer to "splitting one node in one tree structure" and "splitting another node in another tree structure", where "one node in one tree structure" and "another node in another tree structure" are two corresponding nodes in two tree structures.

In other words, when the data dependency between different tree structures is allowed, each leaf CU in the chroma tree should include one or more complete luma leaf CUs or it is completely included in one luma leaf CU. Otherwise, the data dependency between different tree structures is disallowed. In one embodiment, the data dependency between different tree structures is LM chroma mode and/or RM mode. In other words, if the data dependency between different tree structures is allowed, at least one mode with the data dependency between different tree structures (for example, LM chroma mode and/or RM mode) can be a candidate mode being applied; otherwise (i.e., the data dependency between different tree structures is disallowed), such mode with the data dependency between different tree structures (for example, LM chroma mode and/or RM mode) cannot be applied. The RM mode corresponds to residual prediction, such as predicting chroma residual data from luma residual data.

Figure 1:
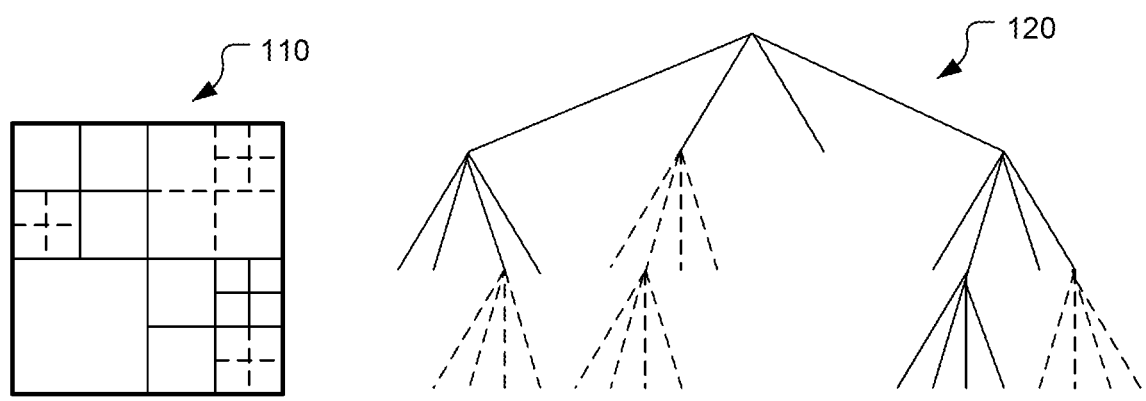
FIG. 1 illustrates an example of block partition using quadtree structure to partition a coding tree unit (CTU) into coding units (CUs).
Figure 2:
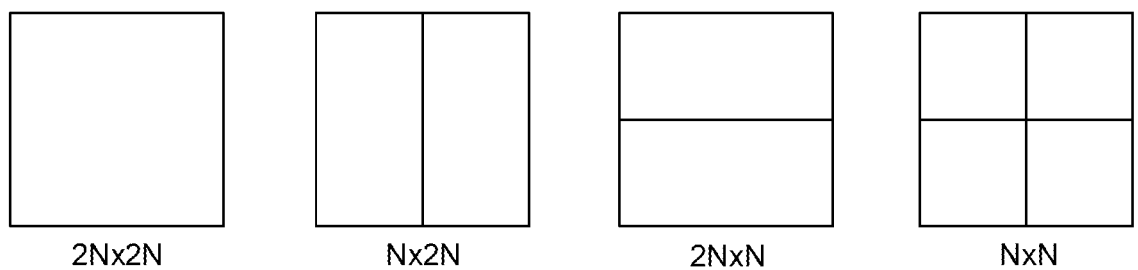
FIG. 2 illustrates asymmetric motion partition (AMP) according to High Efficiency Video Coding (HEVC), where the AMP defines eight shapes for splitting a CU into PU.
Figure 2:
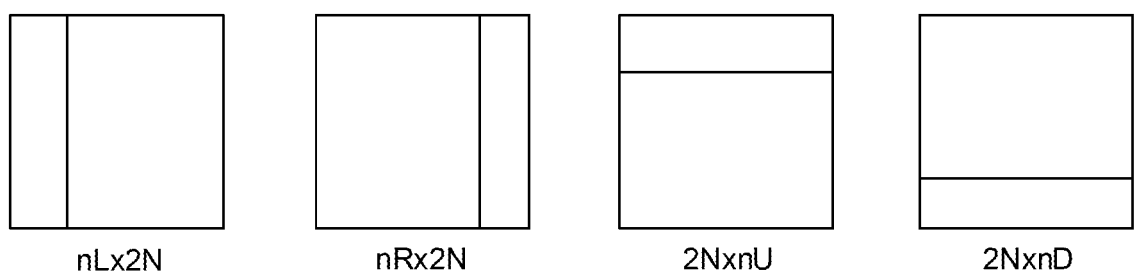
Figure 3:
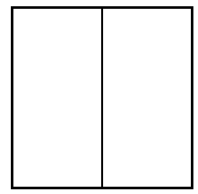
FIG. 3 illustrates an example of various binary splitting types used by a binary tree partitioning structure, where a block can be recursively split into two smaller blocks using the splitting types.
Figure 3:
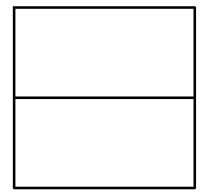
Figure 3:
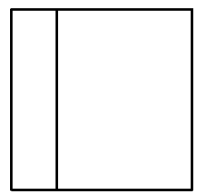
Figure 3:
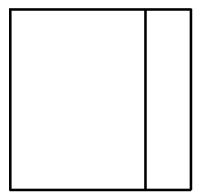
Figure 3:
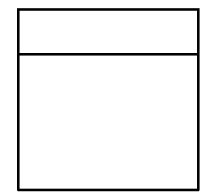
Figure 3:
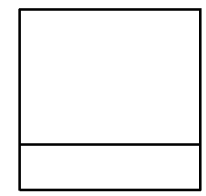
Figure 4:
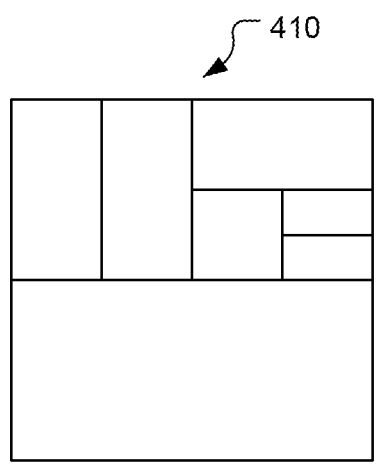
FIG. 4 illustrates an example of block partitioning and its corresponding binary tree, where in each splitting node (i.e., non-leaf node) of the binary tree, one syntax is used to indicate which splitting type (horizontal or vertical) is used, where 0 may indicate horizontal splitting and 1 may indicate vertical splitting.
Figure 4:
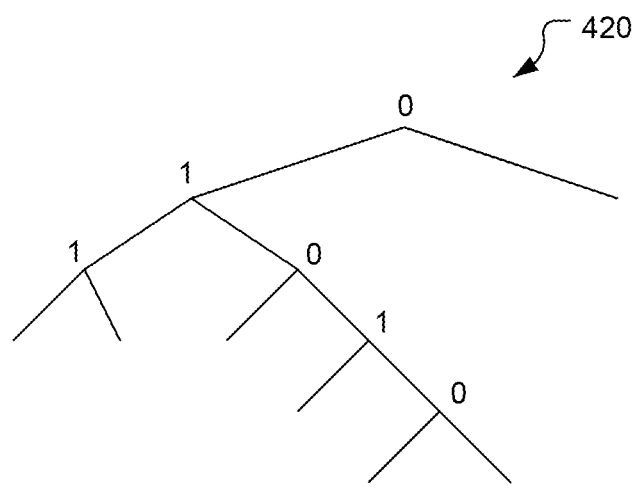
Figure 5:
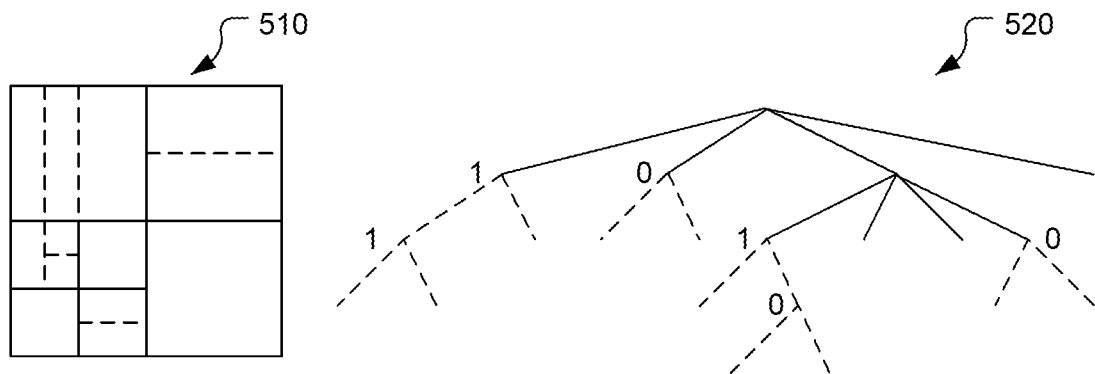
FIG. 5 illustrates an example of block partitioning and its corresponding quad-tree plus binary tree structure (QTBT), where the solid lines indicate quadtree splitting and dotted lines indicate binary tree splitting.
Figure 6:
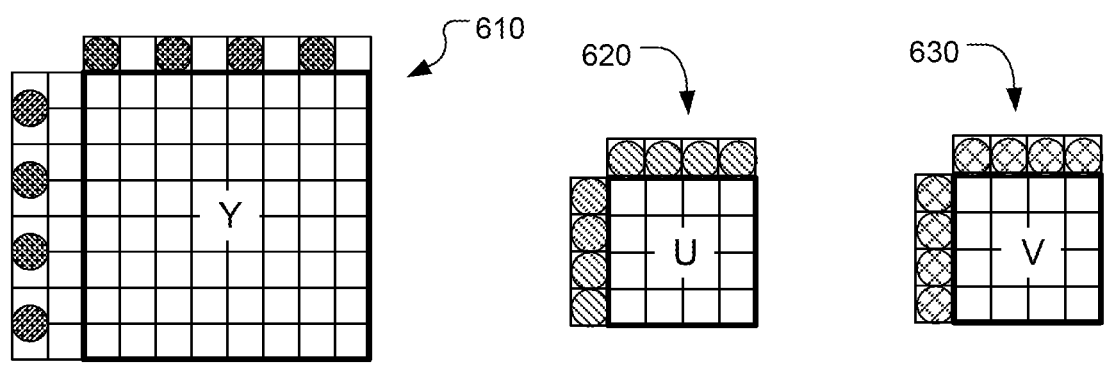
FIG. 6 illustrates an example of chroma Intra prediction (i.e. Linear Model (LM) prediction), where the neighbouring reconstructed pixels (indicated by circles) of a collocated luma block (i.e., Y block) and the neighbouring reconstructed pixels (indicated by circles) of a chroma block (i.e., U or V block) are used to derive the linear model parameters between the blocks.
Figure 7:
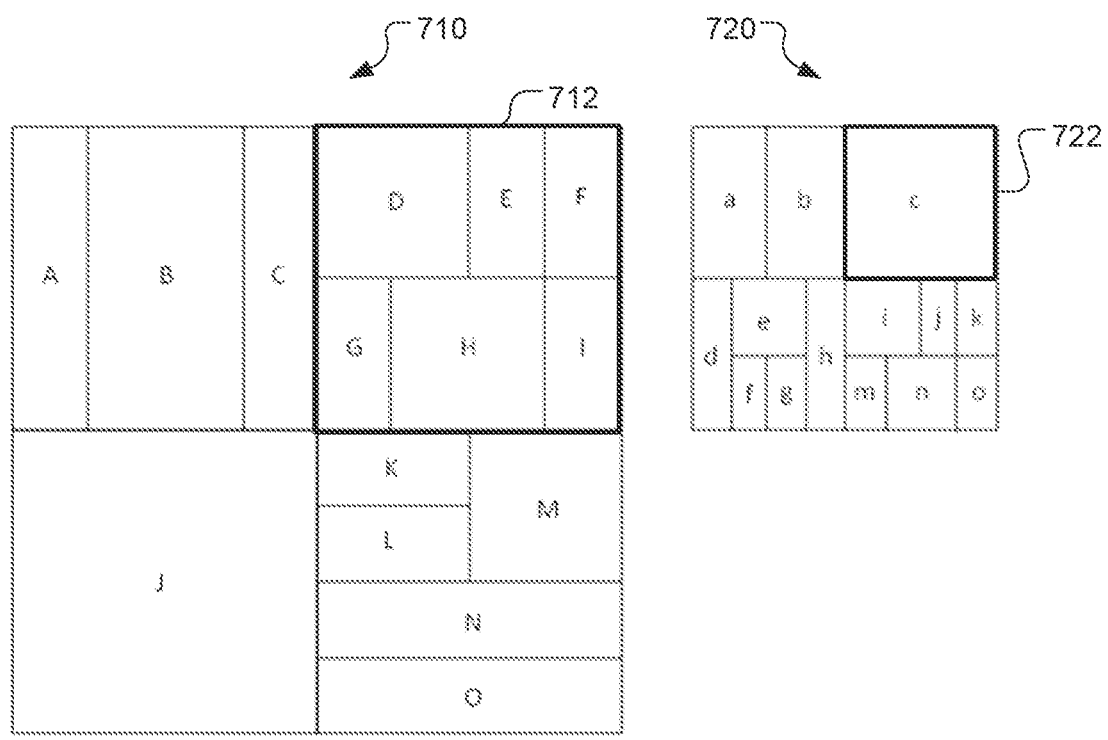
FIG. 7 illustrates an example of the constrained Luma-Chroma separated coding tree coding, where the left block is the tree structure of luma component and the right block is the tree structure of chroma component.

FIG. 7 illustrates an example of the constrained Luma-Chroma separated coding tree coding, where the left block 710 is the tree structure of luma component and the right block 720 is the tree structure of chroma component. For one chroma leaf CU (i.e. a, b, m, n, or o) that cannot be completely included in one luma leaf CU or doesn't include one or more complete luma leaf CUs, the data dependency between different tree structures (i.e. LM chroma mode) is disallowed. For one chroma leaf CU (i.e. c or i) which includes one or more complete luma leaf CUs, the data dependency between different tree structures (i.e. LM chroma mode) is allowed. For one chroma leaf CU (i.e. d, e, f, g, h, j, or k), which is completely included in one luma leaf CU, the data dependency between different tree structures (i.e. LM chroma mode) is also allowed. By using this constraint, the latency of processing chroma Intra mode can be reduced. For example, for chroma leaf CU c, when luma leaf CU D is reconstructed, the top-left block in chroma leaf CU c can be processed before processing luma leaf CU I. In some embodiments, since the data dependency exists between chroma leaf CU a and luma leaf CU B, the reconstruction process of chroma leaf CU a must be processed independently without considering the reconstruction process of luma leaf CUs A and B.

FIG. 7 corresponds to the resulting luma leaf CUs and chroma leaf CUs from respective partition trees, where the whole block corresponds to a root node in a respective partition tree. Each leaf CU corresponds to one leaf node in the partition tree. As shown in FIG. 7, the first-level partition splits the root node into four child nodes. The partitioning for the root node can be a quadtree (QT) split. However, the partitioning can also correspond to horizontal binary (H. BT) partition followed by vertical binary partition (V. BT) or vertical binary partition (V. BT) followed by horizontal binary (H. BT) partition. When two partitioning structures result in the same partitions, the two partitioning structures are referred as equivalent partition or equivalent splitting in this disclosure. In FIG. 7, leaf CU c (722) of the chroma tree 720 covers the same area 712 consisting of leaf CUs D, E, F, G, H and I of the luma tree 710. The chroma node in the chroma tree associated with leaf CU c corresponds to a luma node in the luma tree associated with leaf CUs, D, E, F, G, H and I. In this example, the chroma node associated with leaf CU c is not split. On the other hand, the luma node in the luma tree associated with leaf CUs D, E, F, G, H and I is split by a splitting structure to result in leaf CUs D, E, F, G, H and I. The chroma node associated with leaf CU c and the luma node in the luma tree associated with leaf CUs D, E, F, G, H and I are referred as corresponding nodes in two trees in this disclosure.

The data dependency between different tree structures refers to the data dependency between one or more leaf CUs resulted from one node in one tree and one or more leaf CUs resulted from a corresponding node in another tree. For example, data dependency can be applied between chroma leaf CU c and luma leaf CUs D, E, F, G, H and I.

In another embodiment, for each leaf CU in chroma tree, only when it includes one or more complete luma leaf CUs, the data dependency between different tree structures is allowed. Otherwise, the data dependency between different tree structures is disallowed.

In another embodiment, for each leaf CU in the chroma tree, only when it is completely included in one luma leaf CU, the data dependency between different tree structures is allowed. Otherwise, the data dependency between different tree structures is disallowed.

In another embodiment, for each leaf CU in the chroma tree, only when it is completely included in one luma leaf CU and the corresponding luma leaf CU includes one or more complete leaf chroma CUs, the data dependency between different tree structures is allowed. Otherwise, the data dependency between different tree structures is disallowed.

In another embodiment, the data dependency between different tree structures is allowed when the splitting is not used in one tree or when the splitting is used in one tree and the same splitting or no splitting is used in another tree.

In another embodiment, the data dependency between different tree structures is allowed only when the same splitting structures are used in different trees. In one embodiment, one flag is signalled or inferred at the CTU level or block level to indicate whether the same splitting structures are used in different trees or not. If the same splitting structures are used in different trees, then one of the tree structures can be saved and not signalled. The block level can be defined as the maximum transform size or some pre-defined value according to the profile or the level in one video coding standard. According to another embodiment, the value can be signalled at the sequence level, picture level, slice level, tile group level or tile level.

In another embodiment, the data dependency between different tree structures is allowed when the splitting is used in one tree and the same splitting or no splitting is used in another tree.

In another embodiment, when the different splitting partitions are used for different tree structures, the data dependency between different tree structures is disallowed for those leaf CUs generated by different splitting partitions.

In one embodiment, one or more of the above embodiments can be combined to allow the data dependency between different tree structures while the data dependency between different tree structures may be disallowed other than such combination under different conditions.

In one embodiment, when the data dependency between different tree structures is disallowed, the syntax which indicates the data dependency between different tree structures is used or not is forced to be a predefined value corresponding to not to use the data dependency at the encoder, where the decoder may apply such feature correspondingly (for example, when the data dependency between different tree structures is disallowed, the syntax which indicates the data dependency between different tree structures is used or not is forced to be a predefined value corresponding to not to use the data dependency at the decoder).

In another embodiment, when the data dependency between different tree structures is disallowed, the syntax which indicates the data dependency between different tree structures is used or not is inferred to be one predefined value corresponding to not to use the data dependency, at the encoder, where the decoder may apply such feature correspondingly (for example, when the data dependency between different tree structures is disallowed, the syntax which indicates the data dependency between different tree structures is used or not is inferred to be one predefined value corresponding to not to use the data dependency at the decoder).

In another embodiment, when the data dependency between different tree structures is disallowed, the mode with the data dependency between different tree structures is replaced by a predefined mode without the data dependency.

In the original design of separate partitioning for luma and chroma components, the shapes of luma and chroma blocks can be different, and hence a luma block can extend across different chroma blocks and vice versa. One consequence is that luma and chroma blocks must be processed separately, and the buffered samples for prediction and reconstruction may need to be kept in memory until the entire unit has been processed. On the other hand, if, for example, none of the luma blocks extends across different chroma blocks (i.e., each luma block being entirely inside a chroma block), then after processing a specific chroma block and the luma blocks within, the buffered samples for processing this block can be discarded. To achieve this, we can apply the same partitioning to both luma and chroma blocks multiple times, and then disable further splitting for one of the components. Whether to disable further splitting can be explicitly signalled or implicitly derived based on the size or depth of the current block.

In one embodiment, a flag called chroma_split_end is signalled before or after each luma split flags or syntaxes, indicating whether chroma partitioning terminates at this point, and the subsequent splits will be applied only to the luma component. Before the chroma_split_end is true, the chroma partition is the same as the luma partition. The chroma_split_end flag can be used to indicate that the corresponding split flag represents the last partitioning applied to the chroma component, or that the corresponding split flag and subsequent split flags are not applicable to the chroma component. In one example, when reaching the luma leaf CU and the chroma partition is not terminated (e.g. the chroma_split_end being all false), the chroma_split_end is inferred as true, which means the chroma component is not split anymore. In another example, when reaching a luma leaf CU and the chroma partition is not terminated, the chroma_split syntax or CU split syntaxes for chroma component are applied. The chroma component can be further partitioned into smaller CUs. In one example, when the luma partition is not split, a chroma_split_end is signalled. If the flag is true, the QT/BT/TT split syntaxes are signalled. In another example, when the luma partition is not split, the chroma CU split syntaxes are signalled. If the no split is selected, the chroma CU also stops split. Otherwise, the chroma CU can be further split. The chroma component split syntaxes can follow the rule of CU split. For example, when the binary tree (BT) or ternary tree (TT) split is used, the QT split is not allowed. The chroma QT/BT/TT size/shape/depth constraints can also be applied. For example, if the maximum chroma QT/BT/TT depth or minimum chroma QT/BT/TT size/shape is reached, the chroma_split_end is inferred as false and not signalled. The chroma_split_end can be signalled or inferred when the luma component is coding quad-tree split, binary-tree split, or ternary-tree split. In one example, the chroma_split_end can be signalled or inferred when luma component is coding quad-tree split. If the QT split is before the BT and/or TT split, it means when luma component is doing QT-split, the chroma component needs to follow the QT split or stop the split. When luma component is doing BT/TT-split, the chroma is free to using BT/TT split. In another example, the chroma QT-split can be stopped before the luma QT leaf CU, and the chroma QT leaf CU can be further split by using BT/TT split.

In another embodiment, a flag called chroma_follow_luma_split_flag is used to determine whether the chroma follows the luma split. If the flag is true, the luma and chroma use the same split partition. When a luma CU uses QT/BT/TT split, the chroma CU also uses QT/BT/TT split. When the luma CU stops split, the chroma CU also stops split. If the flag is false, the luma and chroma use different split decision. When luma CU uses QT/BT/TT split, the chroma CU stops split. When the luma CU stops split, the chroma CU is further split. The chroma split syntaxes is further signalled. In one example, when the luma CU stops split, the chroma_follow_luma_split_flag is inferred as true. In another example, when the maximum chroma QT/BT/TT depth or minimum chroma QT/BT/TT size/shape is reached, the chroma_follow_luma_split_flag can also be inferred.

In another embodiment, a flag called luma_split_end is signalled before or after each split flag and the subsequent splits will be applied only to the chroma component. The luma_split_end flag indicates whether luma partitioning terminates at this point. The luma_split_end flag can be used to indicate that the corresponding split flag represents the last partitioning applied to the luma component, or that the corresponding split flag and subsequent split flags are not applicable to the luma component. In one example, when the chroma leaf CU is reached and the luma partition is not terminated (e.g. the luma_split_end are all false), the luma_split_end is inferred as true, which means the luma component is not split anymore. In another example, when the chroma leaf CU is reached and the luma partition is not terminated, the luma split syntax is applied. The luma component can be further partitioned into smaller CUs.

In one embodiment, the CTU is split or inferred split (e.g. inferred QT-split) to a predefined size/shape. The predefined size/shape can be the same as the maximum transform unit size, an M×N block, or an area equal to 1024, 2048, 4096, or 8192. The M×N block can be a predefined (e.g. 64×64), a derived block size, maximum TU size, a size related to maximum/minimum TU size, or an adaptive shape block with area equal to a predefined or a derived block area (e.g. block area equal to 4096, or the virtual pipeline data unit (VPDU) area/size). After split to the predefined size/shape, the proposed CU split method is applied. In one example, the proposed method is only applied in Intra-slice or Intra-tile or Intra-tile group or when dual-tree is enabled.

In another embodiment, when CU size is larger than a predefined size/shape, the share tree partitioning method is used. When the CU is not split and the size is larger than the predefined size/shape, both luma and chroma component are not split. The chroma_split_end syntax is not signalled. The predefined size/shape can be the same as the maximum transform unit size, an M×N block, or an area equal to 1024, 2048, 4096, or 8192. The M×N block can be a predefined (e.g. 64×64), a derived block size, maximum TU size, or a size related to maximum/minimum TU size, or an adaptive shape block with area equal to a predefined or a derived block area (e.g. block area equal to 4096 or the virtual pipeline data unit (VPDU) area/size). When the CU size is smaller or equal to the predefined size/shape, the proposed method is applied. For example, the chroma_split_end or chroma CU split syntaxes can be signalled.

For luma and chroma CU syntaxes signalling, two methods can be applied. In the first method, the luma component and chroma component syntaxes are signalled in an interleaved fashion for a predefined size/shape. The predefined size/shape can be the same as the maximum transform unit size, an M×N block, or an area equal to 1024, 2048, 4096, or 8192. The M×N block can be a predefined (e.g. 64×64) or a derived block size, maximum TU size, a size related to maximum/minimum TU size, an adaptive shape block with an area equal to a predefined or a derived block area (e.g. block area equal to 4096 or the virtual pipeline data unit (VPDU) area/size). The luma component syntaxes of the predefined size/shape are signalled first, then the chroma component syntaxes of the predefined size/shape are signalled. In one example, the CTU is inferred to split to the predefined size/shape. For each block with the predefined size/shape, the luma component syntaxes are signalled before the chroma component syntaxes. In another example, the leaf CU size can be larger than the predefined size/shape. When the leaf CU size can be larger than the predefined size/shape, the luma and chroma share the same partition. The TU tiling syntaxes signalling is applied. The leaf CU can be divided into multiple TUs. For each TU, the luma coefficients are signalled before the chroma coefficients. In the second method, the luma component and chroma component syntaxes are signalled in an interleaved fashion when luma CU is not split or chroma CU is not split. For example, when chroma_split_end is true, the luma CU can be further split. At this level of CU, the luma CUs (including all the child CUs at this level) syntaxes are signalled first, then signal the chroma CU syntaxes. When the chroma_split_end is false and the luma CU stops split, the chroma CU can be further split. At this level of CU, the luma CU syntaxes are first signalled, then the chroma CUs (including all the child chroma CUs at this level) syntaxes are signalled. If the luma and chroma CU stop at the same level, the luma syntaxes are signalled before the chroma syntaxes.

In entropy coding, the context coded bin or bypass bin can be used to signal the chroma CU split syntaxes (e.g. the chroma_split_end or the chroma CU split syntax) when luma CU stops split. When using context coded bin, the neighbouring chroma CU information can be used for context modelling. The chroma_split_end can use the same context modelling or the same context modelling and the same context as the separated tree chroma split syntax. For example, when luma is doing QT split or current chroma CU needs to determine whether to use QT split or not, the chroma_split_end can reuse the context modelling or the context modelling and the context of the QT split or chroma QT split. For determining chroma BT or TT split, the BT/TT no-split flag context modelling or the context modelling and the context are used to determine the chroma_split_end flag value.

In one embodiment, when the luma CU undergoes QT split, the chroma QT split flag is signalled to determine whether the chroma CU follows the luma CU split. When the luma CU undergoes BT or TT split, the chroma no-split flag or the MTT split flag (e.g. mtt_split_cu_flag) is used to determine whether the chroma CU follows the luma CU split. If the chroma CU follows the luma CU split, the split type (e.g. QT/Hor. BT/Ver. BT/Hor. TT/Ver. TT) also follows the luma split type. The syntaxes of split direction and BT/TT selection (e.g. mtt_split_cu_vertical_flag and mtt_split_cu_binary_flag) can be skipped and inferred. In one example, when the luma CU undergoes BT or TT split, the chroma QT-split flag is not signalled. In this case, the chroma QT-split flag is inferred as false. When the luma block stops splitting, the chroma block split syntaxes (e.g. qt_split_cu_flag, mtt_split_cu_flag, mtt_split_cu_vertical_flag, and mtt_split_cu_binary_flag) can be signalled.

In the proposed method, the chroma split syntaxes (e.g. chroma qt_split_cu_flag, chroma mtt_split_cu_flag, chroma mtt_split_cu_vertical_flag, chroma mtt_split_cu_binary_flag, chroma_split_end, and/or chroma_follow_luma_split_flag) can be signalled before or after the luma split syntaxes. In one embodiment, the chroma_split_end or the chroma_follow_luma_split_flag is signalled before the luma split syntaxes. In another embodiment, the chroma_split_end or the chroma_follow_luma_split_flag is signalled after the luma split syntaxes. In another embodiment, the chroma qt_split_cu_flag, chroma mtt_split_cu_flag, chroma mtt_split_cu_vertical_flag, and/or chroma mtt_split_cu_binary_flag, chroma_split_end are signalled after luma split syntaxes. In another embodiment, the chroma_split_end or the chroma_follow_luma_split_flag is signalled after the luma split syntaxes and before the luma CU data syntaxes. In another embodiment, the chroma qt_split_cu_flag, chroma mtt_split_cu_flag, chroma mtt_split_cu_vertical_flag, and/or chroma mtt_split_cu_binary_flag, chroma_split_end are signalled after luma split syntaxes and before the luma CU data syntaxes. In another embodiment, the chroma split syntaxes (e.g. chroma qt_split_cu_flag, chroma mtt_split_cu_flag, chroma mtt_split_cu_vertical_flag, chroma mtt_split_cu_binary_flag, chroma_split_end, and/or chroma_follow_luma_split_flag) are signalled after the luma CU data syntaxes. In another embodiment, when luma CU is split, the chroma split syntaxes (e.g. chroma qt_split_cu_flag, chroma mtt_split_cu_flag, chroma mtt_split_cu_vertical_flag, chroma mtt_split_cu_binary_flag, chroma_split_end, and/or chroma_follow_luma_split_flag) are signalled after the luma split syntaxes and before the luma CU data syntaxes. When the luma CU is not split, the chroma split syntaxes are signalled after the luma CU data syntaxes.

In one embodiment, the contexts of chroma CU split can be different from the luma CU split. An additional context set is used for chroma CU split. In another embodiment, the luma chroma can share the same context set for CU split syntaxes. In another embodiment, the separate context set are used for QT-split and/or MTT-split (e.g. qt_split_cu_flag and/or mtt_split_cu_flag) for the luma and chroma components, the share context set is used for the syntaxes of the split direction and BT/TT selection (e.g. mtt_split_cu_vertical_flag and mtt_split_cu_binary_flag).

In another embodiment, the similar concept of using syntax of chroma_split_end can be implemented by using another syntax design. For example, the luma coding tree is first encoded or decoded. When coding the luma leaf CU or after coding the luma leaf CU, a syntax is encoded/parsed to indicate the chroma leaf CU size. The syntax can be related to the partition depth (e.g. QT-depth, BT-depth, TT-depth, CT-depth, and/or total-depth). For example, such syntax can be called chroma_depth_above. If the chroma_depth_above is equal to 0, it means the chroma CU and luma CU use the same partition and have the same CU size (in luma component unit). In the case of 4:2:0 format, the actual chroma CU size is ¼ of the actual luma CU size. If the chroma_depth_above is larger than 0 (e.g. equal to K), it means the chroma CU partition is stopped at K-depth above. For example, if a luma leaf CU has QT-depth equal to 3 and CT-depth equal to 0, the maximum CTU size is 128 and the size of this luma leaf CU is 16×16. If the chroma_depth_above is equal to 1, it means the chroma CU size is 32×32. The QT-depth of the chroma CU is 2. In this example, the chroma_depth_above syntax is not signalled for the following luma leaf CU if the chroma_depth_above is signalled in this 32×32 area. For example, for the following 3 luma QT CUs with size equal to 16×16 (no need to be a leaf CU), the chroma_depth_above syntax is not signalled. The first luma leaf CU in the next 32×32 area, the chroma_depth_above syntax is signalled. The chroma CU syntax can be signalled after the first luma leaf CU or after the 32×32 area. The 32×32 area is used as an example based on the chroma_depth_above value described in the above example.

In another embodiment, the chroma LM mode is taken into consideration. Since the LM mode is a powerful coding tool to compress the chroma component data, the LM mode syntax short cut can be applied with the method disclosed above. For example, the LM syntax can be applied when the chroma_split_end is equal to 1 or when the chroma_depth_above is signalled. In one embodiment, the LM mode has chance to be enabled (or also called as allowed) when the chroma CU size (in luma sample size) is larger than or equal to the corresponding luma CU size. In another embodiment, the LM mode has chance to be enabled (or also called as allowed) when the chroma_split_end equal to 1 or when the chroma_depth_above is signalled or when the luma and chroma CU stop at the same level (e.g. luma and chroma share the same partition tree in the above level and luma is not split and chroma is not split at the same level). If the luma partition is stopped and the chroma is further split, the LM mode is disabled.

In another embodiment, the adaptive chroma mode syntax is proposed. The chroma mode syntax can be the Intra prediction mode related syntax, motion information or transform/residual related syntax. The chroma syntax order/codeword can be different when the chroma CU size or depth is smaller than, equal to, or larger than the corresponding luma CU size or depth. For example, if the chroma CU size is smaller than the corresponding luma CU size or if the chroma CU depth is larger than the corresponding luma CU depth, the DM mode syntax or LM mode syntax is moved backward. For example, we can move the DM mode or LM mode candidate backward in most probable mode list or move the DM mode syntax or LM mode syntax after the normal syntax position.

In another embodiment, one can specify the maximum partition depth or the minimum block size for which the unified partitioning for luma and chroma is allowed. The maximum partition depth or the minimum block size can be signalled in high-level syntax at the sequence/picture/slice/tile group/tile-level such as SPS/PPS/VPS/slice-header/tile group header/tile header. Once the partition depth exceeds the maximum depth or the block size becomes smaller than the minimum size, only one of the luma and chroma components is allowed to be further split. In another embodiment, if the partition depth is smaller than the maximum partition depth or the block size is larger than the minimum block size, the unified partitioning for luma and chroma is applied. Once the partition depth exceeds the maximum depth or the block size becomes smaller than the minimum size, the separate luma/chroma coding tree is applied.

In another embodiment, the luma CU structure and chroma CU structure should have some correlation in terms of coding unit splitting. To reduce the encoding runtime and improve the coding efficiency, the chroma CU split should follow the luma CU split, but the chroma CU split can be early terminated or can be further split. For example, if the corresponding luma CU is using QT split/BT vertical split/BT horizontal split, the chroma CU has two options. One is to follow the luma split type, and the other one is not to split. If the corresponding luma CU is not split, the chroma CU can be further split. In another embodiment, the chroma CU cannot be split. The early termination flag or following split flag can be inferred under some constraints. For example, the chroma CU split always follows luma CU split in the first K layers. In another example, when CU size is larger than M×N, the chroma CU split always follows the luma CU split. In another example, the chroma QT split always follows the luma QT split. The early stop flag is only for the BT split.

The constraint can be adaptive. For example, the K, M, and N can be derived by the decoded CUs or the neighbouring CUs.

In another embodiment, the proposed guided CU split is only applied when the chroma CU and luma CU have the same QT depth, which means the chroma BT split follows the luma BT split if their QT leaf-CUs are the same size.

In another example, the chroma QT split always follows luma QT split (i.e., sharing the same QT split), but there is no constraint for the BT split.

In one embodiment, the CTU can be split into child CUs. When the CU size/shape is larger than a predefined size/shape, the shared tree partition is applied. If the CU size/shape is equal to or smaller than the predefined size/shape, the separated tree partition is applied. The predefined size/shape can be the same as the maximum transform unit size, or can be an M×N block or an area equal to 1024, 2048, 4096, or 8192. The M×N block can be a predefined (e.g. 64×64 or 32×32), a derived block size, to the maximum TU size, a size related to maximum/minimum TU size, or an adaptive shape block with area equal to a predefined or a derived block area (e.g. block area equal to 4096, or equal to the virtual pipeline data unit (VPDU) area/size). In one example, the CTU is inferred to split into multiple second blocks with a predefined size/shape, then the proposed method mentioned above is applied to the multiple second blocks with the predefined size/shape. The second predefined size/shape can be the same as the maximum transform unit size, or can be an M×N block or area equal to 1024, 2048, 4096, or 8192. The M×N block can be a predefined (e.g. 64×64 or 32×32), a derived block size, the maximum TU size, a size related to maximum/minimum TU size, or an adaptive shape block with area equal to a predefined or a derived block area (e.g. block area equal to 4096, or equal to the virtual pipeline data unit (VPDU) area/size). For example, the CTU can be inferred to split or not inferred to split into multiple 64×64 blocks first. For each 64×64 block, if the CU size is larger than 32×32, the shared tree partitioning is applied. If the CU size is equal to or smaller than 32×32, the separated tree partitioning is applied.

Any of the foregoing proposed methods can be implemented in encoders and/or decoders. For example, any of the proposed methods can be implemented in an entropy encoding module, a prediction generator, or a partition control module at an encoder side. Any of the proposed methods can also be implemented in an entropy parser module, a prediction generator or a partition control module at a decoder side. Alternatively, any of the proposed methods can be implemented as a circuit coupled to the entropy encoding module, a predictor generator, or the partition control module at the encoder side. Any of the proposed methods can be implemented as a circuit coupled to the entropy parser module, a predictor generator, or the partition control module of the decoder, so as to provide the information needed by the entropy parser module or the partition control module.

Video encoders have to follow the foregoing syntax design so as to generate the legal bitstream, and video decoders are able to decode the bitstream correctly only if the parsing process is complied with the foregoing syntax design. When the syntax is skipped in the bitstream, encoders and decoders should set the syntax value as the inferred value to guarantee the encoding and decoding results are matched.

Figure 8:
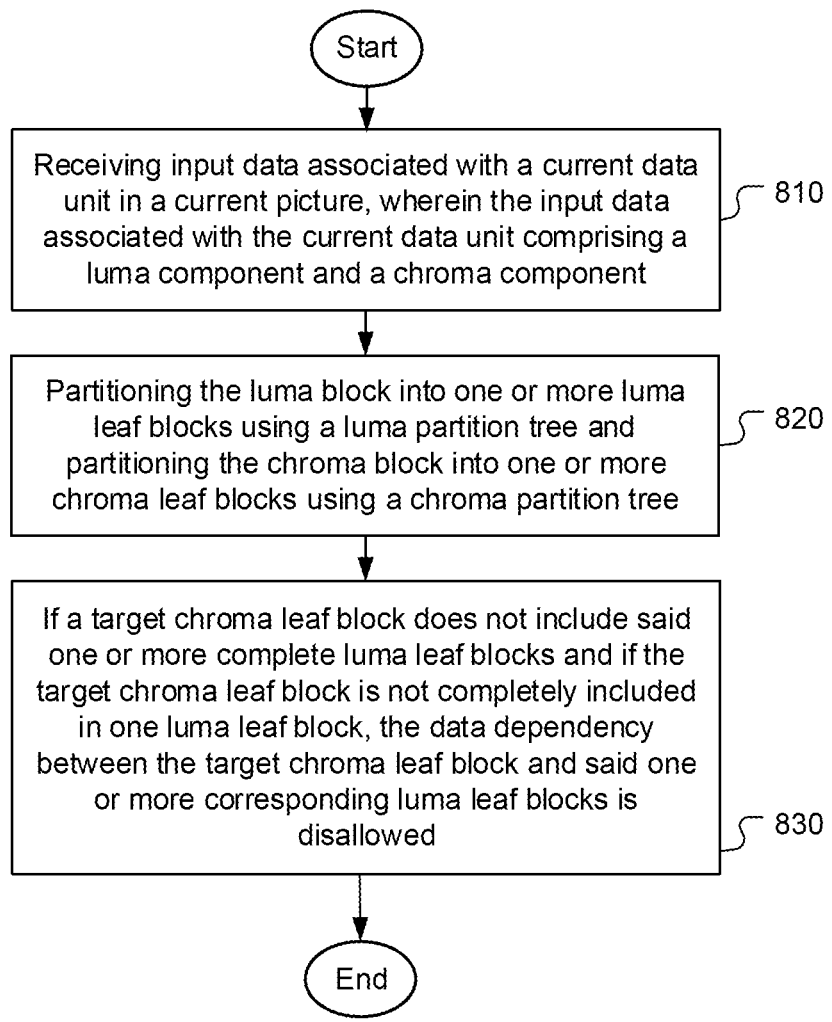
FIG. 8 illustrates a flowchart of an exemplary coding system with adaptive data dependency between one or more leaf blocks partitioned from a first partition tree and one or more leaf blocks partitioned from a second partition tree according to an embodiment of the present invention.

FIG. 8 illustrates a flowchart of an exemplary coding system with adaptive data dependency between one or more leaf blocks partitioned from a first partition tree and one or more leaf blocks partitioned from a second partition tree according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data associated with a current data unit in a current picture are received in step 810, where the input data associated with the current data unit comprise a luma component and a chroma component. The luma block is partitioned into one or more luma leaf blocks using a luma partition tree and the chroma block is partitioned into one or more chroma leaf blocks using a chroma partition tree. In step 830, if a target chroma leaf block does not include said one or more complete luma leaf blocks and if the target chroma leaf block is not completely included in one luma leaf block, the data dependency between the target chroma leaf block and said one or more corresponding luma leaf blocks is disallowed.

Figure 9:
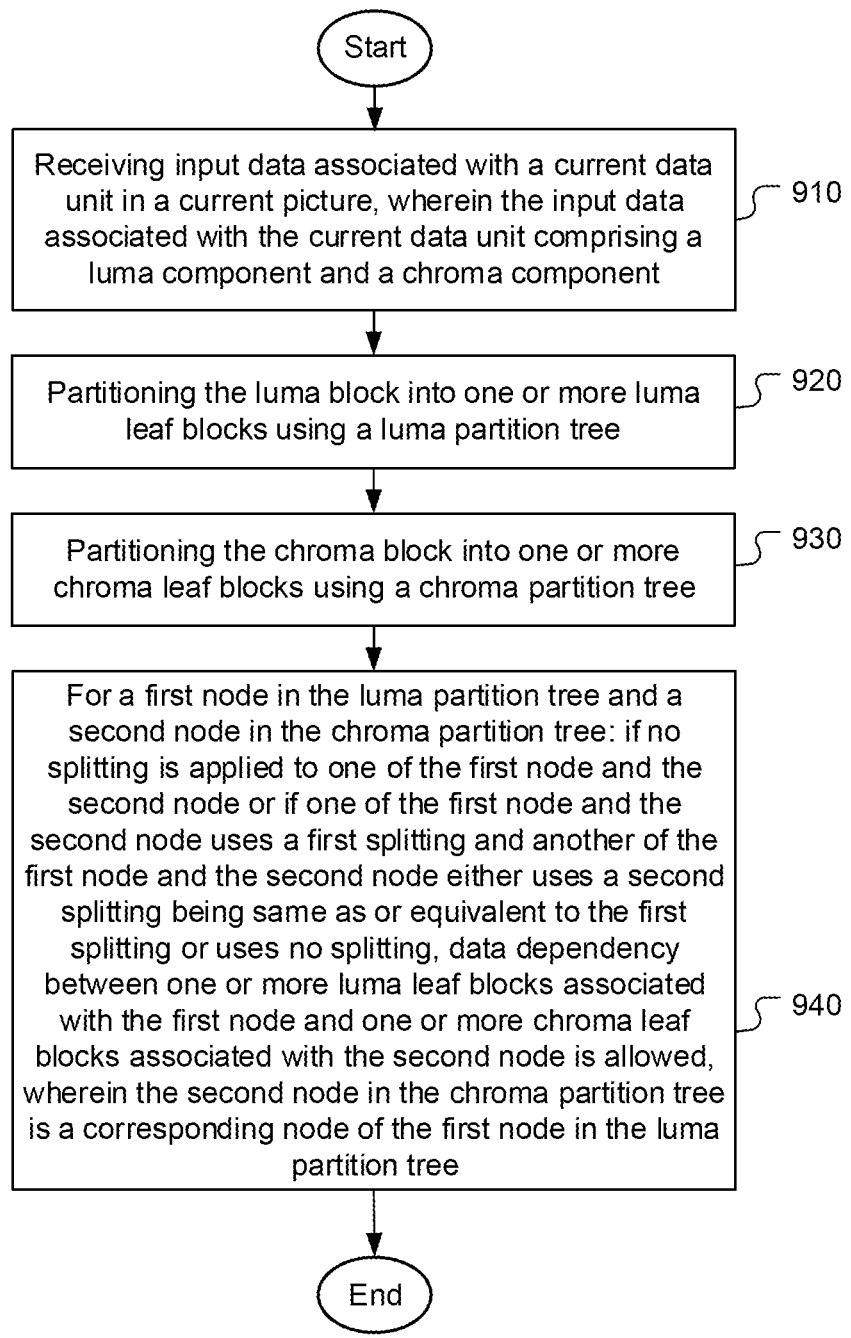
FIG. 9 illustrates a flowchart of another exemplary coding system with adaptive data dependency between one or more leaf blocks partitioned from a first partition tree and one or more leaf blocks partitioned from a second partition tree according to an embodiment of the present invention.

FIG. 9 illustrates a flowchart of another exemplary coding system with adaptive data dependency between one or more leaf blocks partitioned from a first partition tree and one or more leaf blocks partitioned from a second partition tree according to an embodiment of the present invention. According to this method, input data associated with a current data unit in a current picture are received in step 910, where the input data associated with the current data unit comprise a luma component and a chroma component. The luma block is partitioned into one or more luma leaf blocks using a luma partition tree in step 920. The chroma block is partitioned into one or more chroma leaf blocks using a chroma partition tree in step 930. Step 940 is performed for a first node in the luma partition tree and a second node in the chroma partition tree. In step 940, if no splitting is applied to one of the first node and the second node or if one of the first node and the second node uses a first splitting and another of the first node and the second node either uses a second splitting being same as or equivalent to the first splitting or uses no splitting, data dependency between one or more luma leaf blocks associated with the first node and one or more chroma leaf blocks associated with the second node is allowed, wherein the second node in the chroma partition tree is a corresponding node of the first node in the luma partition tree.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding used by a video coding system, the method comprising:

receiving input data associated with a current block in a current picture, wherein the input data comprises pixel data to be encoded at an encoder side or compressed data to be decoded at a decoder side, and wherein the current block comprises a luma block and a chroma block;

partitioning the luma block into one or more luma leaf blocks using a luma partition tree and partitioning the chroma block into a plurality of chroma leaf blocks using a chroma partition tree, the luma partition tree being different from the chroma partition tree such that a first luma leaf block in the one or more luma leaf blocks is associated with multiple chroma leaf blocks in the plurality of chroma leaf blocks; and when a second chroma leaf block in the multiple chroma leaf blocks associated with the first luma leaf block is completely included in the first luma leaf block, determining that a coding tool using data dependency between the first luma leaf block and the second chroma leaf block is allowed.

2. The method of claim 1, wherein each of the multiple chroma leaf blocks associated with the first luma leaf block is completely included in the first luma leaf block.

3. The method of claim 2, wherein after the first luma leaf block and the multiple complete chroma leaf blocks are processed, buffered samples for processing the first luma leaf block and the multiple complete chroma leaf blocks are discarded.

4. The method of claim 1, further comprising:

in response to the coding tool using the data dependency between the first luma leaf block and the second chroma leaf block being allowed, encoding or decoding the second chroma leaf block using information associated with the first luma leaf block.

5. The method of claim 1, further comprising:

in response to the coding tool using the data dependency between the first luma leaf block and the second chroma leaf block being allowed, encoding or decoding the second chroma leaf block using LM (linear model) chroma mode.

6. An apparatus, comprising processing circuitry configured to:

receive input data associated with a current block in a current picture, wherein the input data associated with the current block comprises a luma component and a chroma component and the current block comprises a luma block and a chroma block;

partition the luma block into one or more luma leaf blocks using a luma partition tree and partitioning the chroma block into a plurality of chroma leaf blocks using a chroma partition tree, the luma partition tree being different from the chroma partition tree such that a first luma leaf block in the one or more luma leaf blocks is associated with multiple chroma leaf blocks in the plurality of chroma leaf blocks; and when a second chroma leaf block in the multiple chroma leaf blocks associated with the first luma leaf block is completely included in the first luma leaf block, determine that a coding tool using data dependency between the first luma leaf block and the second chroma leaf block is allowed.

7. A method of video coding used by a video coding system, the method comprising:

receiving input data associated with a current block in a current picture, wherein the input data comprises pixel data to be encoded at an encoder side or compressed data to be decoded at a decoder side, and wherein the current block comprises a luma block and a chroma block;

partitioning the luma block into one or more luma leaf blocks using a luma partition tree;

partitioning the chroma block into a plurality of chroma leaf blocks using a chroma partition tree, the luma partition tree being different from the chroma partition tree such that a first luma leaf node in the luma partition tree is associated with a second chroma non-leaf node in the chroma partition tree, a first luma leaf block in the one or more luma leaf blocks being associated with the first luma leaf node, and multiple chroma leaf blocks in the plurality of chroma leaf blocks being associated with the second chroma non-leaf node; and when a second chroma leaf block in the multiple chroma leaf blocks associated with the second chroma non-leaf block is completely included in the first luma leaf block, determining that a coding tool using data dependency between the first luma leaf block and the second chroma leaf block is allowed.

8. The method of claim 7, wherein each of the multiple chroma leaf blocks associated with the second chroma non-leaf block is completely included in the first luma leaf block.

9. The method of claim 7, wherein a flag is signalled or inferred at a designated level corresponding to the first luma leaf node in the luma partition tree or the second chroma non-leaf node in the chroma partition tree, wherein the flag indicates the data dependency between the first luma leaf block associated with the first luma leaf node and the second chroma leaf block associated with the second chroma non-leaf node is allowed or not.

10. The method of claim 9, wherein the designated level corresponds to a CTU (Coding Tree Unit) level or a block level.

11. The method of claim 10, wherein the block level is inferred.

12. The method of claim 10, wherein the block level is defined as a maximum transform size or a pre-defined value.

13. The method of claim 12, wherein the pre-defined value is signalled at a sequence level, picture level, slice level, tile group level or tile level.

14. The method of claim 7, further comprising:

in response to the coding tool using the data dependency between the first luma leaf block associated with the first luma leaf node and the second chroma leaf block associated with the second chroma non-leaf node being allowed, encoding or decoding the second chroma leaf block associated with the second chroma non-leaf node using information from the first luma leaf block associated with the first luma leaf node.

15. The method of claim 14, wherein the second chroma leaf block associated with the second chroma non-leaf node is encoded or decoded using LM (linear model) chroma mode.

16. An apparatus, comprising processing circuitry configured to:

receive input data associated with a current block in a current picture, wherein the input data comprises pixel data to be encoded at an encoder side or compressed data to be decoded at a decoder side, and wherein the current block comprises a luma block and a chroma block;

partition the luma block into one or more luma leaf blocks using a luma partition tree;

partition the chroma block into a plurality of chroma leaf blocks using a chroma partition tree, the luma partition tree being different from the chroma partition tree such that a first luma leaf node in the luma partition tree is associated with a second chroma non-leaf node in the chroma partition tree, a first luma leaf block in the one or more luma leaf blocks being associated with the first luma leaf node, and multiple chroma leaf blocks in the plurality of chroma leaf blocks being associated with the second chroma non-leaf node; and when a second chroma leaf block in the multiple chroma leaf blocks associated with the second chroma non-leaf block is completely included in the first luma leaf block, determine that a coding tool using data dependency between the first luma leaf block and the second chroma leaf block is allowed.

17. The apparatus of claim 16, wherein each of the multiple chroma leaf blocks associated with the second chroma non-leaf block is completely included in the first luma leaf block.

18. The apparatus of claim 17, wherein after the first luma leaf block and the multiple complete chroma leaf blocks are processed, buffered samples for processing the first luma leaf block and the multiple complete chroma leaf blocks are discarded.

19. The apparatus of claim 6, wherein each of the multiple chroma leaf blocks associated with the first luma leaf block is completely included in the first luma leaf block.

20. The apparatus of claim 19, wherein after the first luma leaf block and the multiple complete chroma leaf blocks are processed, buffered samples for processing the first luma leaf block and the multiple complete chroma leaf blocks are discarded.

* * * * *